United States Patent [19]
Sinner et al.

[11] Patent Number: 5,577,770
[45] Date of Patent: Nov. 26, 1996

[54] DEFORMATION BAR FOR ENERGY-ABSORBING SUPPORT

[75] Inventors: Michael Sinner, Rottenburg; Bernhard Holzapfel, Remshalden, both of Germany

[73] Assignee: Mercedes-Benz AG, Germany

[21] Appl. No.: 520,336

[22] Filed: Aug. 28, 1995

[30] Foreign Application Priority Data

Aug. 26, 1994 [DE] Germany .......................... 44 30 281.9
Mar. 29, 1995 [DE] Germany ........................ 195 11 512.0

[51] Int. Cl.⁶ ................................................. B60R 21/02
[52] U.S. Cl. ........................................ 280/752; 280/751
[58] Field of Search .................................... 280/751, 752, 280/748; 296/189, 35.2, 70

[56] References Cited

U.S. PATENT DOCUMENTS

| | | | |
|---|---|---|---|
| 4,663,210 | 5/1987 | Schreiber et al. | 280/752 X |
| 4,978,136 | 12/1990 | Tomita et al. | 280/751 |
| 5,273,314 | 12/1993 | Sakakibara | 280/752 |
| 5,370,417 | 12/1994 | Kelman et al. | 280/751 |
| 5,482,319 | 1/1996 | Yoshimura et al. | 280/752 |

FOREIGN PATENT DOCUMENTS

| | | |
|---|---|---|
| 5085289 | 4/1993 | Japan . |
| 6087391 | 3/1994 | Japan . |

*Primary Examiner*—Christopher P. Ellis
*Attorney, Agent, or Firm*—Evenson, McKeown, Edwards & Lenahan P.L.L.C.

[57] ABSTRACT

An instrument panel with knee restraint for motor vehicles has a pair of deformation bars which can be deformed in a defined manner with respect to three zones, a load-distributing panel, and a large-surface-area impact-absorption member arranged in front of the load-distributing panel. In order to achieve an inexpensive knee restraint which does not require a redesign of the instrument panel configuration when the knee restraint is mounted on the instrument panel, the deformation bars are arranged on that side of the instrument panel remote from the vehicle interior and are supported, by one leg on the rear surface of the instrument panel and another leg on the transverse carrier fixed to the bodywork. The impact-absorption member is a shell-like carrier part positioned on that side of the instrument panel facing the vehicle interior. A cavity is defined and completely filled by an energy-absorbing insert, e.g. consisting of foam, which forms the energy-absorption element.

11 Claims, 3 Drawing Sheets

DEFORMATION BAR FOR ENERGY-ABSORBING SUPPORT

BACKGROUND AND SUMMARY OF THE INVENTION

The present invention relates to a deformation bar for the energy-absorbing support of a knee restraint which is attached to an instrument panel, and has a load-distributing panel and an impact-absorption member arranged in front of the latter. The profiled deformation bar has an approximately V-shaped extent, of which one leg serves to support the knee restraint and the other leg is supported on a transverse carrier running in the transverse direction of the vehicle and fixed to the bodywork. The deformation bar is provided with two deformation zones, of which the first is arranged in the region of the section connecting the two legs to one another and the second is arranged at a bending location in the region of the load-distributing panel, which is arranged in front and connects two deformation members to one another.

A knee restraint supported via such deformation bars is shown in U.S. Pat. No. 4,978,136. The load-distributing panel is connected, via deformation members, to the deformation bars, of which the V-opening is oriented upwards. The instrument-panel leg end of each deformation bar is additionally supported via a tube piece which is fixed at one end. This results, in the event of knee impact, in local penetration of the upwardly moving knees and, in the case of correspondingly tall individuals, in a hazardous support of the knees on the tube piece, which prevents sideways movements of the load-distributing panel in the event of oblique impact of the knees.

An object of the present invention is to configure the deformation bar, and attach it to the load-distributing panel, to achieve a hazard-free support, irrespective of the height of an individual, of the knees, which do not move upwards in the event of impact, with a high energy-absorption capacity, even in the event of oblique impact of the knees.

This object has been achieved in accordance with the present invention by providing that a V-opening of the V-shaped deformation bar, in an installed position of the latter, is oriented forward and obliquely downward, away from the instrument panel, and a third deformation zone is arranged at an end of the deformation bar remote from the instrument panel so as to come into action, by way of a bending-off movement in the counterclockwise direction, when energy-absorption capacity of the first deformation zone has been utilized, and the legs of the deformation bar come to rest against one another. Only when energy-absorption capacity of the third deformation zone has been utilized, the second deformation zone, together with the load-distributing panel which bounds the instrument panel rearwardly at least in a knee-supporting region and is supported directly on the one leg of the deformation bar up to the first deformation zone of the latter, is transferred into a position approximating an extended position.

In one currently preferred embodiment of the present invention, the energy-absorption capacity of the third deformation zone is particularly well utilized if, at its end remote from the instrument panel, each deformation bar is joined to the transverse carrier and connected thereto. Thereby, upon deformation, the associated third deformation zone wraps around the transverse carrier beyond the perpendicular.

When the transverse carrier is arranged at a different level, that end of each approximately V-shaped deformation bar remote from the instrument panel is adjoined by a further arcuate and non-deformable bar section which is fastened non-releasably to the bottom of the transverse carrier. Overall, this results in an approximately S-shaped configuration for the deformation bar.

Each deformation bar can be provided with a hat-shaped profile. The deformation zones are produced by a specific reduction in the web height and/or the material thickness. If the deformation bar is configured as a light-metal diecasting part, then the deformation zones can be produced particularly easily.

It is, however, also within the scope of the present invention for each deformation to have a hat-shaped profile, and for the deformation zones to be produced in that, adjoining the zones, the hat-shaped profile has reinforcements in the form of beads and/or wall-doubling structure.

The impact-absorption member can be configured as a shell-like carrier part which is positioned on the front surface of the instrument panel, facing the vehicle interior. A cavity is left therebetween, and extends at least over the region where the deformation bar rests against the instrument panel. An energy-absorption element is formed by an energy-absorbing insert which fills the cavity between the carrier part and the instrument panel. In this manner, residual energy can still be absorbed by the insert even after the energy-absorption capacity of the deformation bars has been exhausted.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
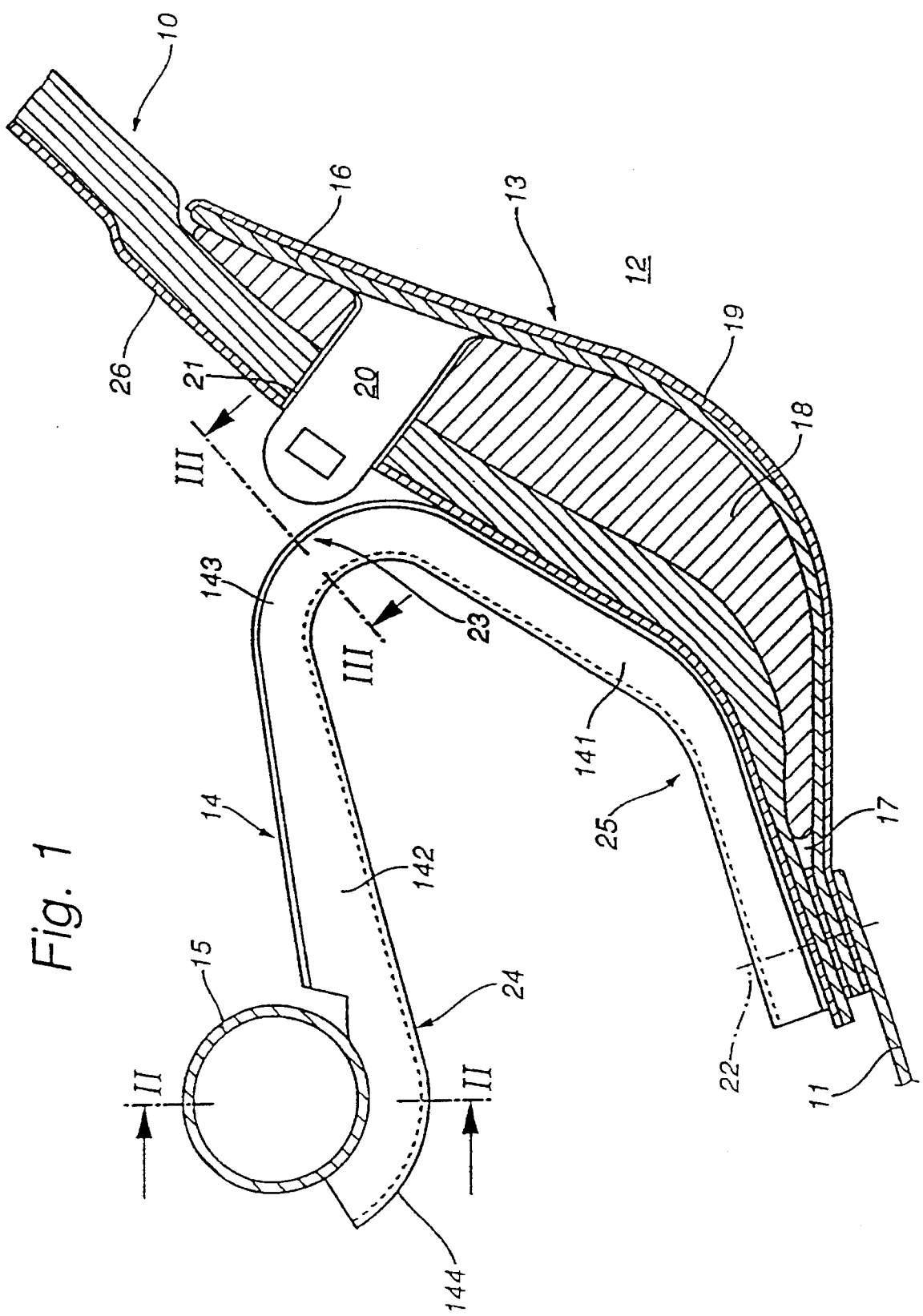
FIG. 1 is a detail, cross-sectional elevation view of an instrument panel with knee restraint according to the present invention.

In FIG. 1, an instrument panel 10 of a motor vehicle is shown in its lower end region facing the footwell in the vehicle interior. The footwell covering indicated by 11 is fastened at its lower free end. The footwell covering 11 and the instrument panel 10 bound the vehicle interior 12 to the front. The instrument panel 10 is equipped with a knee restraint designated generally by numeral 13 and is configured in three parts. The knee restraint 13 comprises two spaced-apart deformation bars 14, which are located on that side of the instrument panel 10 remote from the vehicle interior 12, only one of which can be seen, each of which is approximately in the form of a V and of which the two legs 141, 142 are connected integrally by an arcuate web 143. In the illustrated arrangement, the installed position of the deformation bar 14 is established such that the V-opening is oriented forwards, away from the instrument panel 10.

Figure 2:
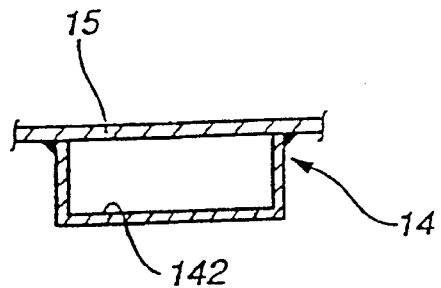
FIG. 2 is a sectional view along line II—II in FIG. 1.
Figure 3:
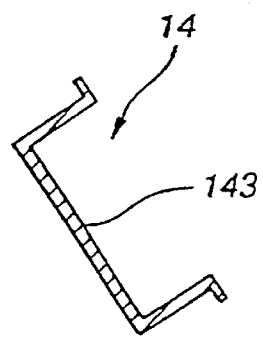
FIG. 3 is a sectional view along line III—III in FIG. 1.

As can be seen from the sectional views in FIGS. 2 and 3, the deformation bar 14 has an essentially hat-shaped, rectangular cross-section. The ends of the cross-sectional legs are bent off outwardly through 90°. These two bent-off portions allow the leg 141 to rest in a planar manner against a load-distributing panel 26 of the instrument panel 10, to be precise on its rear surface remote from the vehicle interior 12. The leg 141 is angled off, at a distance from its free end, into the V-opening of the deformation bar 14 at an obtuse angle. The other leg 142 is arcuately curved at its free end and rests, by way of this curved region, against the underside of a transverse carrier 15 fixed to the vehicle bodywork. In this abutment region, the deformation bar 14 and transverse carrier 15 are connected fixedly to one another.

The knee restraint 13 also has an impact-absorption member configured from sheet steel as a shell-like carrier part 16. Instead of sheet steel, use may also be made of a suitable plastic. The carrier part 16, which functions as a load distributor for the knee forces which have point action upon impact, is located on that side of the instrument panel 10 remote from the deformation bar 14 and is positioned facing the vehicle interior 12, on the front surface, of the instrument panel 10, with a cavity 17 being defined therebetween.

The carrier part 16 extends over the entire region where the deformation bar 14 rests against the instrument panel 10 and further extends a distance upwards beyond this. The cavity 17 is completely filled with an energy-absorbing insert 18, e.g. consisting of foam, of a honeycomb structure or the like, as a part of the knee restraint 13. The insert 18 is selected in terms of its consistency such that, in the event of impact, it is only after full deformation of the deformation bar 14 that it takes effect and absorbs the residual energy which still remains.

The shell-like carrier part 16 is provided with a retaining web 20 which, on the carrier-part inner surface facing the instrument panel 10, projects away from the instrument panel 10 and is guided through an opening in the insert 18. The restraining web 20 corresponds with a clearance 21 in the instrument panel 10, into which clearance 21 the web 20 is plugged in a clip-like manner. In this way, the carrier part 16, with insert 18, is fastened in its upper region.

The lower end of the carrier part 16, together with the instrument panel 10 and the footwell covering 11, is screwed or wedged on the bar leg 141 of the deformation bar 14, which is indicated by a chain-dotted screw center line 22. On its surface, the shell-like carrier part 16 is fully covered with a textile-laminated facing 19 which bears in a planar manner on the surface of the carrier part 16 and is fastened, e.g. adhesively bonded, there.

In order to achieve a predeterminable and easily modifiable deformation characteristic of the deformation bar 14, three defined deformation zones, indicated by 23, 24 and 25, are provided in the deformation bar 14. The first deformation location 23 is located in the arcuate web 143 of the deformation bar 14, the second deformation location 24 is located in the end-side curvature region of the leg 142 at the end 144 remote from the instrument panel, and the third deformation location 25 is located in the angled-off portion of the leg 141.

Figure 4:
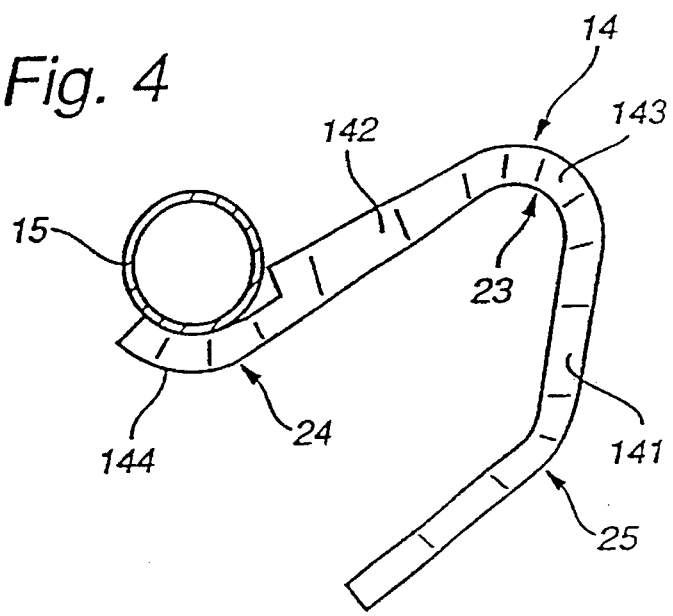
FIGS. 4 and 5, respectively, are side views of the deformation bar of the knee restraint in FIG. 1 in a non-deformed state and in a deformed state after impact.
Figure 5:
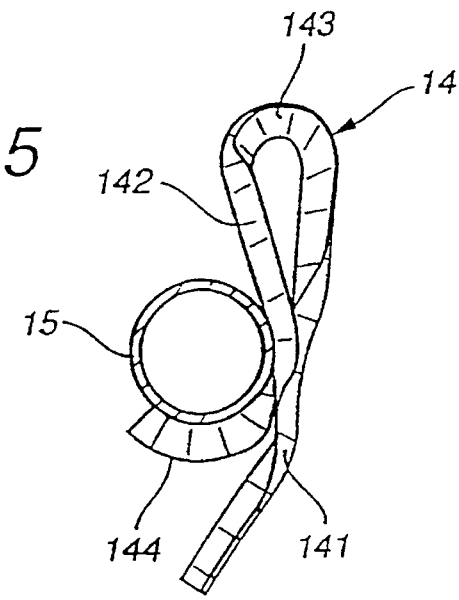

The deformation zones 23, 24, 25 are dimensioned such that, in the event of impact, they take effect one after the other. Energy is thus dissipated in the deformation process, in which case first of each deformation bar 14 crumples, by virtue of the response of the deformation zone 23, and the bar leg 141 is moved onto the bar leg 142 until the two bar-leg ends rest against one another. The leg 141 then wraps around the transverse carrier 15 fixed to the bodywork, the deformation zone 24 taking effect, and, finally, the angled-off portion of the leg 142 widens. This deformation behavior of the deformation bar 14 is depicted in FIGS. 4 and 5. FIG. 4 shows the as yet non-deformed deformation bar 14 before impact, and FIG. 5 shows the deformation bar 14 after impact, deformed in the manner described above. If any residual impact energy still remains after this full deformation of the deformation bar 14, then the remaining energy is absorbed by the foam insert 18 which is then correspondingly compressed.

Figure 6:
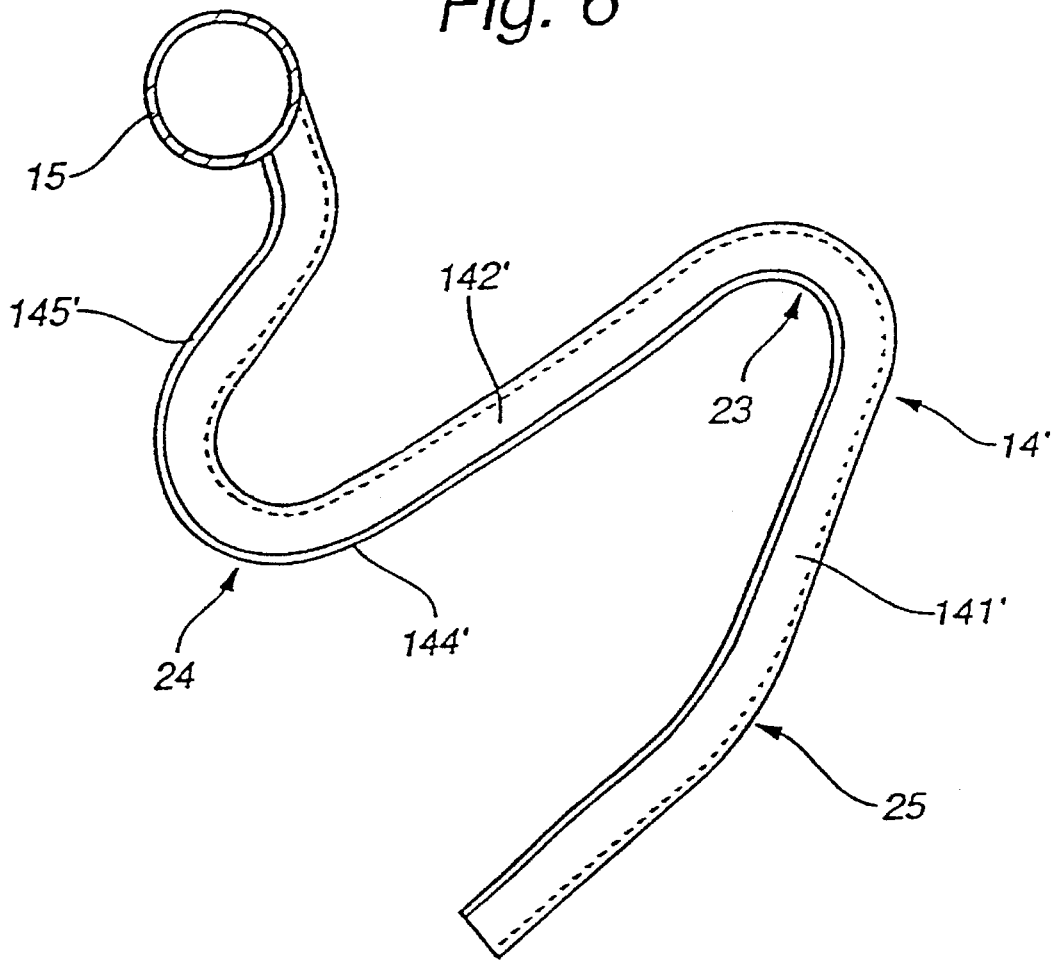
FIGS. 6 and 7, respectively, are side views of an approximately S-shaped deformation bar in accordance with the present invention in a non-deformed state and in a deformed state (FIG. 7) after impact.
Figure 7:
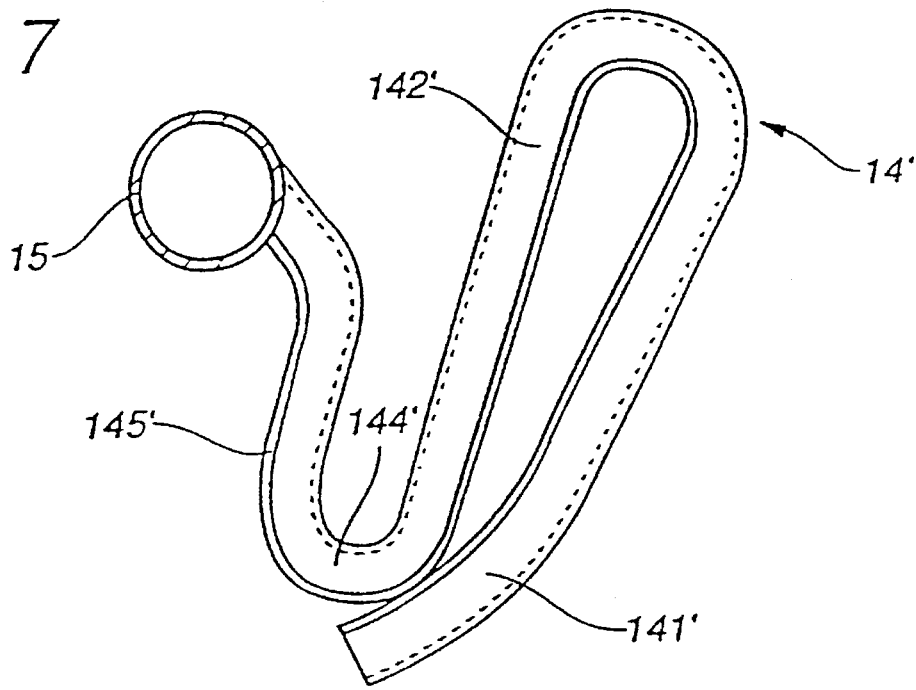

In the case of the deformation bar 14' according to FIGS. 6 and 7, the end 144', remote from the instrument panel 10, of the approximately V-shaped section of the deformation bar 14' is adjoined, in order to connect the deformation bar to a transverse carrier 15 at a high level, by a further arcuate, but non-deformable bar section 145' which is fastened non-releasably to the bottom of the transverse carrier 15. Each deformation bar 14' thus receives an approximately S-shaped configuration with deformation zones 23, 24 and 25 at the same locations as in the deformation bar 14. The deformation zones are represented in the non-deformed state in FIG. 6 and at the end of the deformation action in FIG. 7 in a manner similar to FIGS. 4 and 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A profiled deformation bar for energy-absorbing support of a knee restraint attachable to an instrument panel, said knee restraint having a load-distributing panel and an impact-absorption member arranged in front of said instrument panel, the profiled deformation bar being approximately V-shaped, in which one leg thereof supports the knee restraint and another leg thereof is supported on a transverse carrier running in a transverse direction of a vehicle and fixed to vehicle bodywork, with the legs oriented obliquely downwardly in a forward direction in relation to the instrument panel and the deformation bar being provided with at least two deformation zones, of which a first deformation zone is arranged in a region of the section connecting the legs and a second deformation zone is arranged at a bending location in a region of the load-distributing panel, which is arranged in front and encloses two deformation members between the knee restraint and the load distributing panel, wherein a V-opening of the V-shaped deformation bar, in an installed position of the deformation bar, is oriented forwardly and obliquely downwardly, away from the instrument panel, and a third deformation zone is provided at an end of the deformation bar remote from the instrument panel so as to come into action, by way of a bending-off movement in the counterclockwise direction, when energy-absorption capacity of the first deformation zone has been utilized, and the legs of the deformation bar come to rest against one another, and, only when energy-absorption capacity of the third deformation zone has been utilized, the second deformation zone, together with the load-distributing panel which bounds the instrument panel rearwardly at least in a knee-supporting region and is supported directly on the one leg of the deformation bar up to the first deformation zone of the latter, is transferred into a position approximating an extended position.

2. The profiled deformation bar according to claim 1, wherein, at the end remote from the instrument panel, the deformation bar is joined to the bottom of the transverse carrier and is connected thereto such that upon deformation, the third deformation zone is configured to wrap around the transverse carrier.

3. The profiled deformation bar according to claim 1, wherein the end, remote from the instrument panel, of the deformation bar is adjoined by a further arcuate and non-deformable bar section fastened non-releasably to the bottom of the transverse carrier, to provide an approximately S-shaped configuration for the deformation bar.

4. The profiled deformation bar according to claim 1, wherein the deformation bar has a hat-shaped profile, and the deformation zones are produced by a specific reduction in at least one of web height such that material thickness.

5. The profiled deformation bar according to claim 1, wherein the deformation bar is a light-metal diecasting part.

6. The profiled deformation bar according to claim 1, wherein each deformation bar has a hat-shaped profile, and the deformation zones are configured such that, adjoining said zones, the hat-shaped profile has reinforcements in the form of at least one of beads and wall-doubling means.

7. The profiled deformation bar according to claim 1, wherein the impact-absorption member is a shell-like carrier part positioned on a front surface of the instrument panel facing the vehicle interior, a cavity thereby being defined to extend at least over the region where the deformation bar rests against the instrument panel, and an energy-absorption element is comprised of an energy-absorbing insert substantially filling the cavity between the carrier part and the instrument panel.

8. The profiled deformation bar according to claim 7, wherein the one leg resting against the instrument panel and the shell-like carrier part reach to a lower end of the instrument panel for being fixedly connected to one another and to the instrument panel.

9. The profiled deformation bar according to claim 7, wherein the shell-like carrier part is one of sheet steel and plastic.

10. The profiled deformation bar according to claim 7, wherein the shell-like carrier part is covered by a textile-laminated facing arranged in a planar manner on a vehicle interior facing surface of the shell-like carrier part.

11. The profiled deformation bar according to claim 7, wherein a retaining web projecting away on a carrier-part inner side facing the instrument panel is provided to plug the shell-like carrier part in a clip-like manner, through an opening in the energy-absorbing insert into a clearance in the instrument panel.

* * * * *